(12) United States Patent
Eigenbrodt

(10) Patent No.: US 9,344,001 B2
(45) Date of Patent: May 17, 2016

(54) INVERTER CIRCUITS FOR ELECTRICAL MACHINES

(71) Applicant: Control Techniques Limited, Newtown (GB)

(72) Inventor: Peter Eigenbrodt, Sankt Augustin (DE)

(73) Assignee: CONTROL TECHNIQUES LIMITED, Newtown (GB)

( * ) Notice: Subject to any disclaimer, the term of this patent is extended or adjusted under 35 U.S.C. 154(b) by 0 days.

(21) Appl. No.: 14/173,095

(22) Filed: Feb. 5, 2014

(65) Prior Publication Data

US 2014/0218980 A1     Aug. 7, 2014

(30) Foreign Application Priority Data

Feb. 6, 2013  (GB) .................................. 1302092.0

(51) Int. Cl.
| | |
|---|---|
| *H02M 1/12* | (2006.01) |
| *H02M 7/42* | (2006.01) |
| *H02J 3/18* | (2006.01) |
| *H02P 9/08* | (2006.01) |

(52) U.S. Cl.
CPC .............. *H02M 7/42* (2013.01); *H02J 3/1885* (2013.01); *H02P 9/08* (2013.01); *Y02E 40/32* (2013.01)

(58) Field of Classification Search
CPC ............. H02J 3/18; H02J 3/005; H02J 3/006; H02J 3/40; H02J 3/1821; H02J 3/1892; H02M 7/42; H02M 1/12; G05F 1/70; Y02E 40/12; Y02E 40/30
USPC ............................................ 323/205; 363/40
See application file for complete search history.

(56) References Cited

U.S. PATENT DOCUMENTS

| | | | | |
|---|---|---|---|---|
| 5,225,712 | A | * | 7/1993 | Erdman ......................... 290/44 |
| 5,550,451 | A | | 8/1996 | Itoh et al. |
| 5,606,490 | A | | 2/1997 | Hong |
| 5,629,598 | A | | 5/1997 | Wilkerson |
| 7,905,813 | B2 | | 3/2011 | Edelson et al. |
| 8,188,610 | B2 | | 5/2012 | Scholte-Wassink |
| 8,436,490 | B2 | | 5/2013 | Gertmar et al. |
| 8,564,149 | B2 | | 10/2013 | Holle et al. |
| 2012/0074786 | A1 | * | 3/2012 | Johnson et al. ................. 307/66 |
| 2012/0218789 | A1 | * | 8/2012 | Langhorst ....................... 363/37 |
| 2013/0155731 | A1 | * | 6/2013 | Reichard et al. ................ 363/37 |

FOREIGN PATENT DOCUMENTS

| | | |
|---|---|---|
| CN | 1976211 | 6/2007 |
| CN | 203968029 | 11/2014 |
| WO | 2009/150464 | 12/2009 |

OTHER PUBLICATIONS

The Asynchronous Generator in Small Power Plants, Thomas Fladerer, Mar. 2004, 12 pgs.
Eaton Wiring Manual Jun. 2011, Electronic Motor Starters and Drives, 102 pgs.
Starting and control of three-phase asynchronous motors, Jörg Randermann, 2010, 12 pgs.

* cited by examiner

*Primary Examiner* — Adolf Berhane
*Assistant Examiner* — Yemane Mehari
(74) *Attorney, Agent, or Firm* — Harness, Dickey & Pierce, P.L.C.

(57) ABSTRACT

An inverter circuit comprises an inverter which can be configurable for controlling the supply of mains current from a grid to an electric machine in a start-up mode whereby the machine drives the prime mover for initialization. Thereafter the same inverter is reconfigurable as part of the circuit to supply reactive power to the grid when the machine is running as a generator powered by the prime mover.

14 Claims, 2 Drawing Sheets

INVERTER CIRCUITS FOR ELECTRICAL MACHINES

CROSS-REFERENCE TO RELATED APPLICATION

Figure 1:
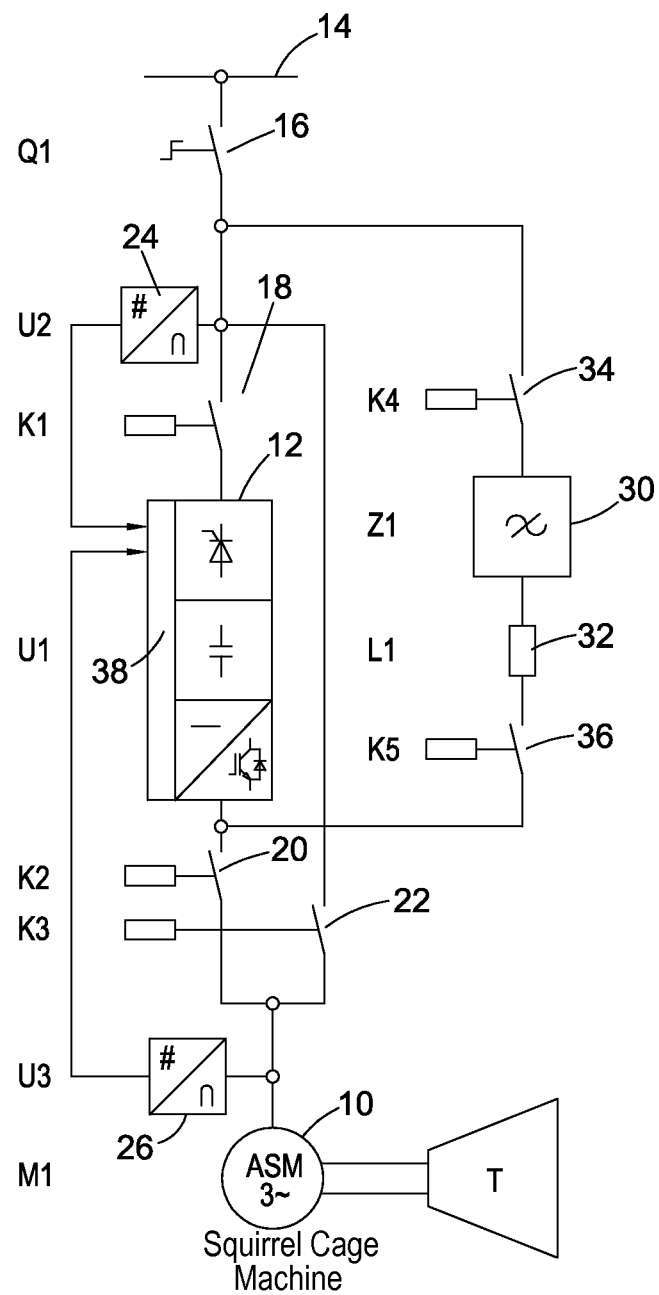
Figure 1:
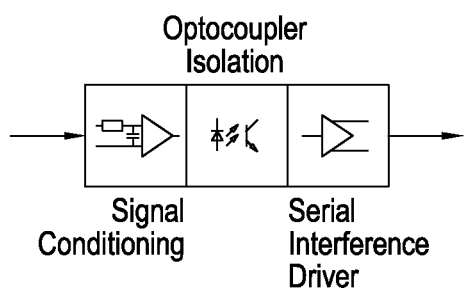

This application claims the benefit and priority of Great Britain Patent Application No. 1302092.0 filed Feb. 6, 2013. The entire disclosure of the above application is incorporated herein by reference.

FIELD

This invention relates to generators producing electrical power. The invention is particularly, though not exclusively, relevant to generators using asynchronous machines.

BACKGROUND

When preparing to start a generator to supply electrical power to a grid or other network, it is known to run the electrical machine constituting the generator as a motor in order to turn the prime mover and run it up to speed. To control the machine in this motoring mode the electrical machine is controlled by an inverter. The machine consumes electrical power from the grid and drives the prime mover so that it can be started and run up to speed. After operating speed is reached the machine can be configured to run as a generator driven by the prime mover and can feed electrical power to the grid. Examples of prime movers are different types of turbines and internal combustion engines but are not limited to these.

Typically, an asynchronous electrical machine, such as a conventional squirrel cage machine, is connected to a grid to supply active power.

The main grid network of a country or region is dominated by major sources of electrical power. For example, as a consequence of the decision by the government of Germany to move away from the generation of electrical power using nuclear sources, the grid is no longer dominated by a small number of big power plants but by an increasing number of smaller contributers. Besides the contribution of active power these contributers need to take part in the contribution of reactive power as well, as the major sources of electrical power have done up to now.

This presents a significant problem for the suppliers of electrical power, with systems being based on asynchronous machines that provide active power only. The cost of retro-fitting electrical generator sets with a reactive power outputs capability would be prohibitive. A cost-effective solution is needed that enables an active power generator plant to be able to be converted to delivering reactive power, for example, in compliance with legislation as set out above. The disclosed embodiments herein are applicable to the above situation or to any situation in which reactive power is required.

SUMMARY

According to disclosed embodiments described, a power delivery circuit for a source of electrical power to an electrical supply network comprises a source of electrical power, a frequency inverter connected between the source and the network and means for configuring the frequency inverter to supply electrical power to the source in an initialization phase in which the source is synchronised to the network, and configuring the frequency inverter to deliver a reactive power to the network in a supply phase.

The frequency inverter is used both to enable the source to be initialized to the network power and to provide reactive power to the source. For example, an asynchronous AC machine can be run as a motor to initialize the prime mover to which it is connected, and, after the machine has driven the prime mover up to speed, the frequency inverter is reconfigured from driving the machine to providing reactive power for the network, for example, an AC power grid.

A system already using a frequency inverter of that type according the descriptions within the embodiments can be reconfigured to provide reactive power to a grid without having to install an alternative reactive power source. This is a significant cost saving by utilising the existing frequency inverter for dual purposes.

According to embodiments disclosed herein a frequency inverter is used to drive an asynchronous machine and is then used for the distribution of reactive power.

There is disclosed herein an inverter for an electrical machine comprising an inverter configurable to be connected to draw electrical power from a node to run the machine as a motor, and also configurable to be connected to provide reactive power to the network in parallel with electrical output of the machine when run as a generator.

There is also disclosed herein an inverter circuit for an electrical machine comprising an inverter, control means for controlling the inverter, first voltage sensing means for monitoring a voltage on an input of the inverter and second voltage sensing means for monitoring a voltage on an output of the inverter, the outputs of the first and second voltage sensing means being connected with the control means, the circuit further comprising switch means controlled by the control means for configuring the connection of the output of the inverter according to the signals from the first and second voltage sensing means.

DRAWINGS

Figure 2:
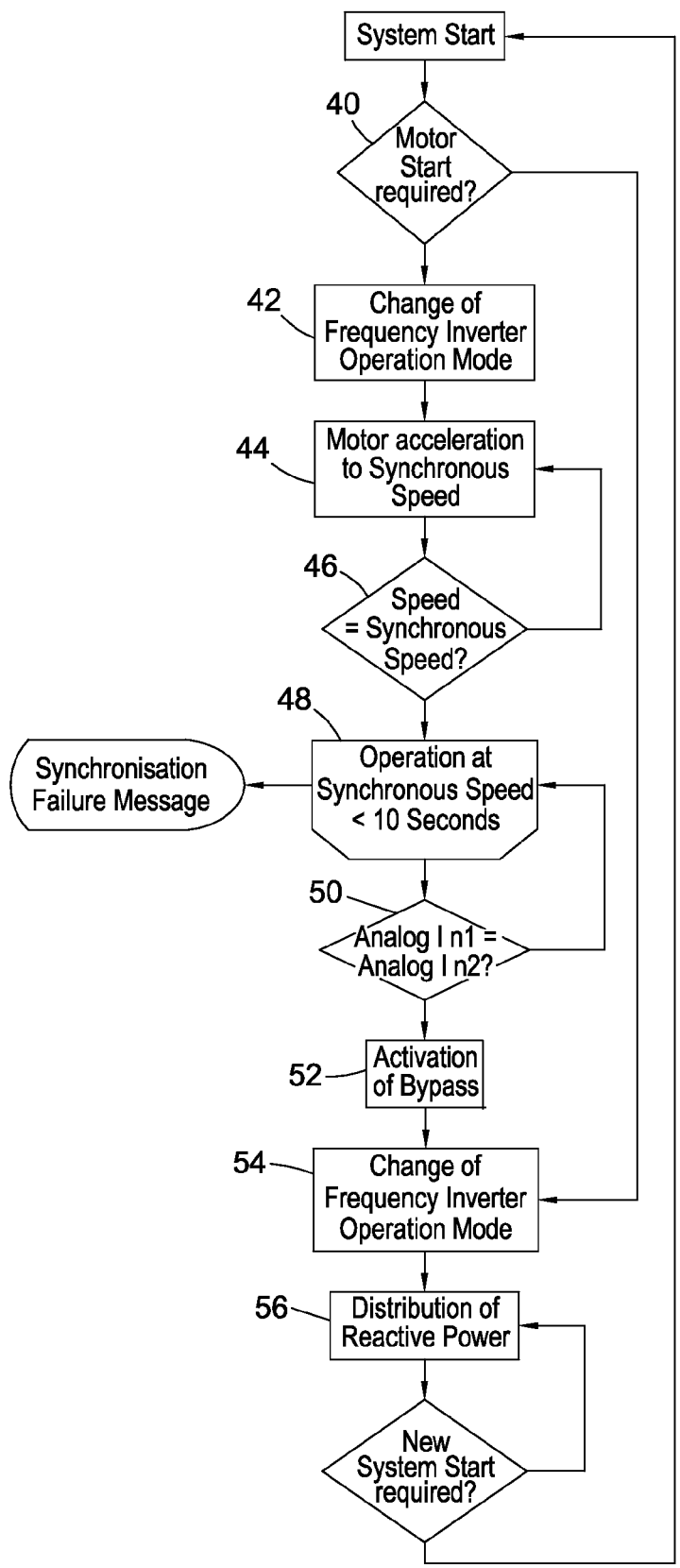

Embodiments disclosed herein will now be described with reference to the accompanying drawings, showing a power circuit of start-up and synchronization equipment with reactive power distribution, in which:

FIG. 1 is a circuit diagram of an inverter circuit, showing system principles; and FIG. 2 is a flow diagram of the operation of the inverter circuit of FIG. 1, showing software application control.

DETAILED DESCRIPTION

Referring to FIG. 1, a supply circuit for an asynchronous electric machine 10 is connected to a grid of electrical power. It comprises a frequency inverter 12 which, in this embodiment, is a Control Techniques Limited frequency inverter type Unidrive SP. The grid is depicted by a rail 14. It is connected through a circuit breaker 16 and a mains contactor 18 to the frequency inverter 12. The output of the inverter 12 is connected to the asynchronous machine 10 (e.g., a squirrel cage machine as shown in FIG. 1). A by-pass contactor 22 connects the machine 10 directly to the mains by by-passing the frequency inverter.

A voltage-to-digital converter 24 provides a digital signal indicative of the grid mains voltage to a processor of the frequency inverter 12. The converter 24 uses signal conditioning of the mains voltage and an opto-isolator providing a signal to the signal interface driver from which the digital signal is derived for a processor 38 of the inverter. Likewise, a similar voltage-to-digital converter 26 provides a digital signal indicative of the voltage at the machine 10 to the processor 38. The processor controls the inverter switching operations and the actuation of the contactors by which the disclosed circuit is reconfigured as described below.

A mains filter 30 and a mains inductor 32 are connected in series from between the mains contactor 18 and the circuit breaker 16 on one side, and to the output of the inverter 12 on the other side. Mains and front end contactors 34 and 36 control the connection of the filter and inductor to the inverter 12. Whilst schematically illustrated in FIG. 1, because the circuit is applicable across a range of applications, a typical situation involves the machine 10 being driven by a turbine T and the grid 14 being a national power distribution network providing AC mains voltage at, for example, 3AC400V Like many forms of prime mover, the turbine has to be started, in this case by being driven up to speed before being ignited. As will be described, the inverter 12 can be configured to drive the machine 10 to run as a motor using power drawn from the grid 14. This, in turn, drives the turbine up to the desired speed. After the turbine T is running under its own power, the circuit is reconfigured so that the machine 10 is driven by it and the electrical power generated is delivered to the grid 14 as active power. The circuit depicted in FIG. 1 is, of course, connected to an overall control system which is not shown for the sake of clarity. Referring to FIG. 2, the processor 38 of the inverter 12 determines whether a motor start is required at step 40. If yes, the inverter 12 is configured in a motor start mode of operation by closing the mains and motor contactors 18 and 20 at step 42. The motor accelerates to motoring speed at step 44. When the motor 10 reaches synchronous speed at step 46 the motor output is monitored using the voltage to digital converter 26 output to the processor 38 for a period to ensure stable operation (say 10 seconds) at step 48. The processor then checks for the equivalence of the voltages of the machine and the mains from the voltage to digital converters 24 and 26. When voltages are substantially equal and stable at step 50 the frequency inverter 12 is by-passed at step 52. Processor 38 of the inverter receives voltage signals directly from the voltage to digital converters 24 and 26. In conventional systems the control of the synchronisation between the grid and the machine output is ceded to the overall control architecture. It inevitably involves processing and transmission delays. Matters of milliseconds can be significant in the delay between the actual optimum synchronisation point and the moment at which the bypass is activated. This can result in significant surge currents due to the error and the consequent lack of complete synchronisation. According to the circuit of FIG. 1 the processing of the voltage signals by the voltage to digital converters 24 and 26, the subsequent processing of their signals locally and the immediate control of the bypass contactor 22 reduce processing delay to a minimum. It is found that using control for synchronisation locally based on the inverter 12 has a significant beneficial effect on the surge current on switching from an initial phase on start-up to a generating phase as described.

The ability to react to the condition of synchronism between the machine and mains voltages is advantageously rapid so that the accuracy of the switching can be near as possible coincident with synchronism. It is significantly improved over the prior art situation in which control of the switching and processing was carried out by a control system located elsewhere. The greater the accuracy of the switching from initialization to delivery of power to the grid, then the smaller will be the surge current due to any mismatch between the two. Step 54 is a by-pass step to by-pass the motoring mode as above when a motor start is no longer required. Conventionally, after the inverter has been used to drive the machine during the start-up and is, thereafter, redundant until the next start up event. The output of the machine 10 is delivered through the bypass circuit to the mains.

According to this disclosed embodiment the inverter is used for distribution of reactive power. When synchronisation is confirmed at step 48/50 the bypass is activated by closing the bypass contactor 22 and opening the contactor 20. The electrical output of the machine 10 bypasses the inverter and the machine enters a mains mode from the start mode. Contactors 34 and 36 are closed to bring in-circuit the filter components of the filter 30 and inductance 32, thereby connecting the output of the inverter 12 to mains via the filter components 30 and 32. The inverter 12 is connected to the mains through the filter 30 by closing the mains contactor 34 and front and contactor 36. The inventor is power run as a reactive component of the said power contribution. The grid will contain an inductive component. Thus, the capacitance of the DC link of the inverter and the inductance of the grid can both store energy and an exchange energy between them. The electrical output from the circuit to the mains at 14 is now provided with a reactive component by virtue of the action of the inverter 12 which was previously used only in the start mode on start-up and would thereafter otherwise have been inactive until needed again for start-up. The configuration of the circuit to use the inverter for both modes is a very cost-effective way of turning a previously active output from the machine into a reactive output compatible with the mains network without having to install new sources of reactive power contributing to the grid.

The disclosed circuit incorporates the functions necessary to operate an asynchronous motor to synchronous speed and to enable the distribution of reactive power thereafter. The frequency inverter is used for the dual purposes of controlling the machine as a motor and the distribution of reactive power.

The processing by the processor of the voltages indicated by the converters 24 and 26, and the actuation of the by-pass contactor enable the surge currents to be limited. The inverter has a grid operation mode as well as a motor start-up mode, it is possible for the same inverter to be used for the two functions.

COMPONENT LIST

K1, K4—Mains Contactor
K2—Motor Contactor
K3—Bypass Contactor
K5—Front End Contactor
L1—Mains Inductor
U1—Frequency Inverter
U2, U3—Voltage Measurement
Q1—Circuit Breaker
M1—Asynchronous Motor
Z1—Mains Filter
Frequency Inverter Details
U1—Control Techniques (CT) frequency inverter type Unidrive SP, equipped with CT's SM-Application Plus Module featuring a Co-Processor programmed using CT's Sypt Pro Programming system
U2, U3—Signal output wired to analog inputs of U1, Analog In 1 & Analog In 2
K1 . . . 5—Contactors operated by U1

The invention claimed is:

1. An inverter circuit for an electrical machine, the inverter circuit comprising one or more contactors and an inverter having an input for connecting to a network and an output for connecting to an electrical machine or the network, the inverter being configurable to be connected to draw electrical power at its input from the network to run the machine as a motor in a start-up mode of the inverter, the inverter also being configurable to be connected to provide reactive power to the network in parallel with an electrical output of the machine by controlling the one or more contactors such that the output of the inverter is connected to the network via the one or more contactors when the machine is run as a generator in a grid operation mode of the inverter after the start-up mode of the inverter.

2. The inverter circuit as claimed in claim 1 including a filter connectable between the inverter and the network.

3. The inverter circuit as claimed in claim 2 in which part of the filter is an inductor.

4. The inverter circuit as claimed in claim 1 including a bypass configurable by the one or more contactors to connect the electrical output of the machine to the network.

5. The inverter circuit as claimed in claim 1 in which the inverter is an insulated gate bipolar transistor inverter.

6. The inverter circuit as claimed in claim 1 in which the network includes an electrical mains network.

7. The inverter circuit as claimed in claim 1 in which the machine is an asynchronous machine.

8. An inverter circuit for an electrical machine, the inverter circuit comprising an inverter having an input for connecting to a network and an output for connecting to an electrical machine or the network, the inverter configured to operate in a start-up mode and a grid operation mode, control means for controlling the inverter, first voltage sensing means for monitoring a voltage on an input of the inverter, and second voltage sensing means for monitoring a voltage on an output of the inverter, the outputs of the first and second voltage sensing means being connected with the control means, the inverter circuit further comprising switch means controlled by the control means for configuring the connection of the output of the inverter according to signals from the first and second voltage sensing means so that the inverter draws electrical power at its input from a network to run the machine as a motor when the inverter is in the start-up mode and provides reactive power to the network in parallel with an electrical output of the machine by controlling the switch means such that the output of the inverter is connected to the network via the switch means when the machine is run as a generator when the inverter is in the grid operation mode after the start-up mode.

9. The inverter circuit as claimed in claim 8 in which the first and second voltage sensing means are voltage to digital converters.

10. The inverter circuit as claimed in claim 8 in which the control means control the inverter operation and actuation of the switch means.

11. The inverter circuit as claimed in claim 8 including a bypass circuit configurable by the switch means to bypass the inverter.

12. The inverter circuit as claimed in claim 11 in which the control means are operable to enable the bypass circuit in response to the voltages indicated by the outputs of the voltage sensing means being substantially the same.

13. The inverter circuit as claimed in claim 8 in which the control means are attached to the inverter.

14. The inverter circuit as claimed in claim 7 in which the machine is a squirrel cage machine.

* * * * *